US012522738B2

(12) United States Patent
Jordan et al.

(10) Patent No.: US 12,522,738 B2
(45) Date of Patent: Jan. 13, 2026

(54) MIXTURE CURABLE TO PROVIDE AN INTUMESCENT COATING MATERIAL

(71) Applicant: Advanced Innergy LTD, Gloucester (GB)

(72) Inventors: Laura Louise Jordan, Gloucester (GB); Simon Jones, Gloucester (GB); Simon Harry Shepherd, Gloucester (GB); Anil Naik, Gloucester (GB)

(73) Assignee: ADVANCED INNERGY LTD., Gloucester (GB)

( * ) Notice: Subject to any disclaimer, the term of this patent is extended or adjusted under 35 U.S.C. 154(b) by 733 days.

(21) Appl. No.: 17/608,478

(22) PCT Filed: Apr. 28, 2020

(86) PCT No.: PCT/GB2020/051039
§ 371 (c)(1),
(2) Date: Nov. 2, 2021

(87) PCT Pub. No.: WO2020/225531
PCT Pub. Date: Nov. 12, 2020

(65) Prior Publication Data
US 2022/0220320 A1    Jul. 14, 2022

(30) Foreign Application Priority Data

May 3, 2019 (GB) .................................. 1906231

(51) Int. Cl.
| | |
|---|---|
| *C09D 7/20* | (2018.01) |
| *C08K 7/02* | (2006.01) |
| *C09D 5/18* | (2006.01) |
| *C09D 7/02* | (2006.01) |
| *C09D 7/48* | (2018.01) |
| *C09D 163/00* | (2006.01) |
| *C09D 171/00* | (2006.01) |
| *C09D 175/04* | (2006.01) |
| *C09D 201/10* | (2006.01) |
| *C09K 21/04* | (2006.01) |

(52) U.S. Cl.
CPC ............... *C09D 5/185* (2013.01); *C08K 7/02* (2013.01); *C09D 7/20* (2018.01); *C09D 7/48* (2018.01); *C09D 163/00* (2013.01); *C09D 171/00* (2013.01); *C09D 175/04* (2013.01); *C09D 201/10* (2013.01); *C09K 21/04* (2013.01)

(58) Field of Classification Search
None
See application file for complete search history.

(56) References Cited

U.S. PATENT DOCUMENTS

| | | | | |
|---|---|---|---|---|
| 4,725,457 | A * | 2/1988 | Ward ..................... | C08G 59/58 525/428 |
| 2008/0121851 | A1* | 5/2008 | Reinheimer ........... | C08G 59/56 252/606 |
| 2009/0264558 | A1 | 10/2009 | Kramer et al. | |
| 2012/0174508 | A1 | 7/2012 | Brooks et al. | |
| 2022/0411571 | A1* | 12/2022 | Parent ................ | C08G 59/5033 |

FOREIGN PATENT DOCUMENTS

| | | |
|---|---|---|
| CN | 101528796 A | 9/2009 |
| DE | 102012221451 A | 5/2014 |
| DE | 102012224300 A1 | 6/2014 |
| JP | 2012246665 A | 12/2012 |
| JP | 2016-526600 A | 9/2016 |
| JP | 2018-159065 A | 10/2018 |
| WO | 02077110 A1 | 10/2002 |
| WO | 2010131037 A1 | 11/2010 |
| WO | 2020225531 A1 | 11/2020 |

OTHER PUBLICATIONS

English Translation JP 2012246665 (Year: 2012).*
"International Search Report and Written Opinion of the International Searching Authority for PCT Patent Application No. PCT/GB2020/051039", Mailed Date: Jul. 31, 2020, 10 Pages.
"Office Action for Japanese Patent Application No. 2022-512483", Mailed Date: Feb. 13, 2024, 8 pages.
"Office Action for Chinese Patent Application No. 202080048443.1", Mailed Date: Apr. 24, 2022, 25 pages.
"Office Action for Mexican Patent Application No. MX/a/2021/013353", Mailed Date: Aug. 20, 2025, 4 pages.
"Office Action for Mexican Patent Application No. MX/a/2021/013353", Mailed Date: Nov. 5, 2025, 7 pages.
"Notice of Final Rejection for Korean Patent Application No. 10-2021-7039521", Mailed Date: Oct. 29, 2025, 13 pages.

* cited by examiner

*Primary Examiner* — Tanisha Diggs
(74) *Attorney, Agent, or Firm* — CALFEE, HALTER & GRISWOLD LLP

(57) ABSTRACT

A mixture curable to provide an intumescent coating material. The mixture comprises a silane-terminated polymer, a cross-linker for curing the silane-terminated polymer, an epoxy resin, a cross-linker for curing the epoxy resin, and an intumescent package.

19 Claims, No Drawings

MIXTURE CURABLE TO PROVIDE AN INTUMESCENT COATING MATERIAL

TECHNOLOGICAL FIELD

Examples of the disclosure relate to a mixture curable to provide an intumescent coating material, a method of providing an intumescent coating material, an intumescent coating material, an intumescent coating for protecting a substrate, a method of protecting a substrate with an intumescent coating, and a protected substrate.

BACKGROUND

It is often required to provide an intumescent coating around substrates such as pipework, valves, I-beams, and other process components and structural members, for example in hydrocarbon facilities on or off shore. There is also a requirement to provide an intumescent coating around substrates used in transportation, for instance automotive components and structural members of vehicles.

When subjected to a fire event an intumescent coating expands to form a protective char. The protective Char acts as a physical barrier insulating the substrate and therefore delaying the effects of a fire and slowing the rate of temperature increase of the coated substrate. This therefore potentially protects the substrate from failing or delays the occurrence of failure, thereby providing additional time to permit evacuation, for example, of personnel from a hydrocarbon facility or of the occupants of a vehicle, and/or for fire fighting.

There is a requirement to provide intumescent coatings which have improved properties.

All proportions referred to in this specification are indicated as % by weight of the total composition.

BRIEF SUMMARY

According to various, but not necessarily all, examples of the disclosure there is provided a mixture curable to provide an intumescent coating material, wherein the mixture comprises a silane-terminated polymer, a cross-linker for curing the silane-terminated polymer, an epoxy resin, a cross-linker for curing the epoxy resin, and an intumescent package.

The ratio of silane-terminated polymer to epoxy resin may be from 0.75 to 0.25:0.25 to 0.75, and may be from 0.6 to 0.4:0.4 to 0.6, and may be 1:1.

The mixture curable to provide an intumescent coating material may be a two-part mixture. Possibly, a first part of the two-part mixture comprises the epoxy resin and the intumescent package, and a second part of the two-part mixture comprises the silane-terminated polymer, the cross-linker for curing the silane-terminated polymer, and the cross-linker for curing the epoxy resin.

The silane-terminated polymer may comprise silane-terminated polyether or silane-terminated polyurethane. The mixture may comprise 10 to 30% by weight of the silane-terminated polymer, and preferably may comprise 14 to 20% by weight of the silane-terminated polymer.

The cross-linker for curing the silane-terminated polymer may comprise a multifunctional silane, such as an amino silane. The mixture may comprise 1 to 3% by weight of the cross-linker for curing the silane-terminated polymer, and preferably may comprise 1.4 to 2% by weight of the cross-linker for curing the silane-terminated polymer.

The mixture may comprise 6 to 25% by weight of the epoxy resin, and preferably may comprise 12 to 17% by weight of the epoxy resin.

The epoxy resin may comprise bisphenol A epoxy resin, bisphenol F epoxy resin, or a combination of bisphenol A epoxy resin and bisphenol F epoxy resin. The epoxy resin may further comprise an epoxy functionalised reactive diluent, or a plurality of different epoxy functionalised reactive diluents. The epoxy resin may comprise bisphenol A epoxy resin, bisphenol F epoxy resin, or a combination of bisphenol A epoxy resin and bisphenol F epoxy resin, and an epoxy functionalised reactive diluent. The epoxy resin may comprise bisphenol A epoxy resin, bisphenol F epoxy resin, or a combination of bisphenol A epoxy resin and bisphenol F epoxy resin, and a plurality of different epoxy functionalised reactive diluents.

The mixture may comprise 5 to 15% by weight of the bisphenol A epoxy resin, bisphenol F epoxy resin, or a combination of bisphenol A epoxy resin and bisphenol F epoxy resin. Preferably the mixture may comprise 9 to 12% by weight of the bisphenol A epoxy resin, bisphenol F epoxy resin, or a combination of bisphenol A epoxy resin and bisphenol F epoxy resin. The mixture may comprise 1 to 10% by weight of the epoxy functionalised reactive diluent or the plurality of different epoxy functionalised reactive diluents, and preferably may comprise 3 to 5% by weight of the epoxy functionalised reactive diluent or the plurality of different epoxy functionalised reactive diluents.

The cross-linker for curing the epoxy resin may comprise a monomeric amine, a polymeric amine, or an anhydride curative. The cross-linker for curing the epoxy resin may be isophorone diamine. The mixture may comprise 1.5 to 6% by weight of the cross-linker for curing the epoxy resin, and preferably may comprise 2 to 4% by weight of the cross-linker for curing the epoxy resin.

The mixture may comprise 45 to 75% by weight of the intumescent package, and preferably may comprise 50 to 65% by weight of the intumescent package.

The intumescent package may comprise a phosphorus containing compound, a gas source, and a carbon source. The intumescent package may comprise a phosphorus containing compound and a gas source. Possibly, the intumescent package does not comprise a carbon source. The intumescent package may comprise an infrared blocker. Possibly, in some examples of the disclosure the intumescent package does not comprise boric acid or borate salts. In other examples of the disclosure, the intumescent package may comprise boric acid or borate salts.

The mixture may comprise 25 to 65% by weight of the phosphorus containing compound, and preferably may comprise 30 to 45% by weight of the phosphorus containing compound. The phosphorus containing compound may comprise a fire retardant comprising a phosphate group, a phosphite group, or phosphonate group. Possibly, the fire retardant comprising a phosphate group is ammonium polyphosphate, triphenyl phosphate, or melamine polyphosphate. The phosphorous containing compound may comprise ammonium polyphosphate.

The mixture may comprise 5 to 30% by weight of the gas source, and preferably may comprise 10 to 20% by weight of the gas source. The gas source may comprise melamine, tris-(2-hydroxyethyl) isocyanurate (THEIC), or boric acid. The gas source may comprise melamine.

The mixture may comprise 0.1 to 15% by weight of the carbon source, and preferably may comprise 1 to 5% by weight of the carbon source. The carbon source may comprise pentaerythritol or dipentaerythritol.

The mixture may comprise 1 to 15% by weight of the infrared blocker, and preferably may comprise 1.5 to 5% by weight of the infrared blocker. The infrared blocker may comprise titanium dioxide.

The mixture may comprise reinforcing fibres. The mixture may comprise 1 to 6% by weight of the reinforcing fibres, and preferably may comprise 2 to 3% by weight of the reinforcing fibres. The reinforcing fibres may comprise basalt fibres, ceramic fibres, carbon fibres, mineral fibres or glass fibres, and may be of any length between 50 μm to 15 mm. The ceramic fibres may comprise enfil ceramic fibres or lapinus fibres.

In other examples, the mixture does not comprise reinforcing fibres.

The mixture may comprise a rheology modifier. The mixture may comprise 0.1 to 4% by weight of the rheology modifier, and preferably may comprise 0.1 to 2% by weight of the rheology modifier. The rheology modifier may comprise an organoclay, fumed silica, fibres, liquid rheological additives, or hollow glass microspheres. The organoclay may comprise garamite.

The mixture may comprise a moisture scavenger. The moisture scavenger may comprise molecular sieves or vinyl silane. The molecular sieves may be synthetic zeolite or natural zeolite. The mixture may comprise 0.01 to 4% by weight of the moisture scavenger, and preferably may comprise 0.1 to 1% by weight of the moisture scavenger.

The mixture may comprise a reactive diluent. The reactive diluent may comprise vegetable oil. The vegetable oil may comprise castor oil. The mixture may comprise 0.1 to 5% by weight of the reactive diluent, and preferably may comprise 0.1 to 1% by weight of the reactive diluent.

The mixture may comprise a solvent. The solvent may comprise xylene, dimethyl carbonate, or benzyl alcohol. The mixture may comprise 0.01 to 15% by weight of the solvent, and preferably may comprise 1 to 9% by weight of the solvent.

The mixture may comprise a wetting or dispersing aid. The wetting or dispersing aid may comprise organosilane or alkoxy siloxane. The mixture may comprise 0.01 to 3% by weight of the wetting or dispersing aid, and preferably may comprise 0.1 to 1.5% by weight of the wetting or dispersing aid.

The mixture may comprise a boron containing compound. The boron containing compound may comprise zinc borate, boric acid, or boric oxide. The mixture may comprise 1 to 10% by weight of the boron containing compound, and preferably may comprise 3 to 7% by weight of the boron containing compound.

Possibly, the mixture does not comprise plasticiser.

According to various, but not necessarily all, examples of the disclosure there is provided a method, wherein the method comprises:

mixing a silane-terminated polymer, a cross-linker for curing the silane-terminated polymer, an epoxy resin, a cross-linker for curing the epoxy resin, and an intumescent package;

allowing the mixture to cure to provide an intumescent coating material.

Possibly the method comprises providing the mixture as a two-part mixture.

Possibly, the epoxy resin and the intumescent package are provided in a first part of the two-part mixture, and the silane-terminated polymer, the cross-linker for curing the silane-terminated polymer, and the cross-linker for curing the epoxy resin are provided in a second part of the two-part mixture, wherein the method comprises mixing the first and second parts and allowing the mixture of the first and second parts to cure to provide an intumescent coating material.

The mixture may be allowed to cure by exposure to an atmosphere which comprises moisture. The mixture may be allowed to cure by exposure to moisture already present in the mixture, which moisture may be already present in the intumescent package. The mixture may be allowed to cure at ambient temperature, that is, any temperature between 5° C. and 50° C. To reduce cure time, the mixture may be allowed to cure at elevated temperatures, that is, above 50° C.

According to various, but not necessarily all, examples of the disclosure there is provided an intumescent coating material, wherein the intumescent coating material is the cured reaction product of a mixture comprising a silane-terminated polymer, a cross-linker for curing the silane-terminated polymer, an epoxy resin, a cross-linker for curing the epoxy resin, and an intumescent package.

According to various, but not necessarily all, examples of the disclosure there is provided a body of intumescent coating material, wherein the body of intumescent coating material is the cured reaction product of a mixture comprising a silane-terminated polymer, a cross-linker for curing the silane-terminated polymer, an epoxy resin, a cross-linker for curing the epoxy resin, and an intumescent package.

According to various, but not necessarily all, examples of the disclosure there is provided an intumescent coating for protecting a substrate, the intumescent coating comprising an intumescent coating material, wherein the intumescent coating material is the cured reaction product of a mixture comprising a silane-terminated polymer, a cross-linker for curing the silane-terminated polymer, an epoxy resin, a cross-linker for curing the epoxy resin, and an intumescent package.

The intumescent coating may comprise a plurality of layers of the intumescent coating material.

The intumescent coating may comprise a mesh. The mesh may be provided between respective layers of the intumescent coating material. The mesh may comprise stainless steel, basalt, silica, carbon or glass fibre.

Alternatively, the intumescent coating may not comprise a mesh.

The substrate may be metallic or non-metallic. The substrate may comprise a non-metallic coating, and the intumescent coating is provided on the non-metallic coating. The non-metallic coating may be an anti-corrosion coating.

According to various, but not necessarily all, examples of the disclosure there is provided a method of protecting a substrate, the method comprising:

applying an intumescent coating material to the substrate, wherein the intumescent coating material is the cured reaction product of a mixture comprising a silane-terminated polymer, a cross-linker for curing the silane-terminated polymer, an epoxy resin, a cross-linker for curing the epoxy resin, and an intumescent package.

The substrate may be metallic or non-metallic.

In some examples, the method may comprise coating the substrate with the mixture and allowing the mixture to cure to provide an intumescent coating comprising the intumescent coating material.

The mixture curable to provide an intumescent coating material may be applied to a non-metallic coating on the substrate. The non-metallic coating may be an anti-corrosion coating.

In other examples, the method may comprise applying a body of intumescent coating material to the substrate to provide an intumescent coating comprising the intumescent coating material, wherein the body of intumescent coating material is the cured reaction product of the mixture. The body of intumescent coating material may be a sheet of intumescent coating material.

The body of intumescent coating material may be applied to a non-metallic coating on the substrate. The non-metallic coating may be an anti-corrosion coating.

The method may comprise providing the substrate with a plurality of layers of the intumescent coating material. The method may comprise providing a mesh between respective layers of the intumescent coating material. The mesh may comprise stainless steel, basalt, silica, carbon or glass fibre.

The method may comprise applying a top seal to the intumescent coating. The top seal may provide weather protection and/or be decorative.

According to various, but not necessarily all, examples of the disclosure there is provided a protected substrate, the substrate comprising an intumescent coating comprising an intumescent coating material, wherein the intumescent coating material is the cured reaction product of a mixture comprising a silane-terminated polymer, a cross-linker for curing the silane-terminated polymer, an epoxy resin, a cross-linker for curing the epoxy resin, and an intumescent package.

The substrate may be metallic or non-metallic. The substrate may comprise a non-metallic coating, and the intumescent coating is provided on the non-metallic coating. The non-metallic coating may be an anti-corrosion coating.

According to various, but not necessarily all, examples of the disclosure there may be provided examples as claimed in the appended claims.

BRIEF DESCRIPTION

For a better understanding of various examples that are useful for understanding the detailed description, reference will now be made by way of example only.

DETAILED DESCRIPTION

Examples of mixtures according to the disclosure (E1 to E4) are provided in Table 1 below, along with a comparative example (C1).

an epoxy resin, a cross-linker for curing the epoxy resin, and an intumescent package. An intumescent package may otherwise be known as an intumescent ingredient.

Some examples of the disclosure do not comprise plasticisers. A plasticiser is a non-reactive diluent.

In some examples of the disclosure, the intumescent package comprises a phosphorus containing compound, a gas source, and a carbon source. The intumescent package may also comprise an infrared blocker. In some examples, the carbon of the intumescent package may be provided by the carbon content of the polymer system.

In examples 1 (E1), 3 (E3) and 4 (E4) the ratio of silane-terminated polymer to epoxy resin is 1:1. In example 2 (E2), the ratio of silane-terminated polymer to epoxy resin is 0.6 to 0.4. Ratios are calculated on the basis of % by weight. Accordingly, in example 2 the curable mixture comprises 19.58% by weight of silane-terminated polymer and 13.04% by weight of epoxy resin, which is a ratio of 0.6 to 0.4. In other examples, the ratio of silane-terminated polymer to epoxy resin may be from 0.75 to 0.25 to 0.25 to 0.75.

The mixture may comprise 1.5 to 6% by weight of the cross-linker for curing the epoxy resin, and 1 to 3% by weight of the cross-linker for curing the silane-terminated polymer. However, the mixture may comprise an amount sufficient to cure the epoxy resin and silane-terminated polymer.

Examples of the disclosure also provide a method. The method comprises mixing a silane-terminated polymer, a cross-linker for curing the silane-terminated polymer, an epoxy resin, a cross-linker for curing the epoxy resin, and an intumescent package. The method comprises allowing the

TABLE 1

| Component | Specific example of component | E1 (wt %) | E2 (wt %) | E3 (wt %) | E4 (wt %) | C1 (wt %) |
| --- | --- | --- | --- | --- | --- | --- |
| silane-terminated polymer | silane-terminated polyether (trade name Geniosil STP-E10 available from Wacker) | 16.44 | 19.58 | 15.12 | 14.1 | 16.89 |
| cross-linker for curing the silane-terminated polymer | amino silane | 1.66 | 1.96 | 1.52 | 1.41 | 1.64 |
| epoxy resin | bisphenol A epoxy resin (trade name DER331 available from DOW) and epoxy functionalised reactive diluent (trade name DER732P available from DOW) | 16.44 | 13.04 | 15.12 | 14.1 | 0 |
| cross-linker for curing the epoxy resin | Isophorone diamine (IPD) | 3.25 | 2.57 | 3 | 2.85 | 0 |
| phosphorus containing compound | ammonium polyphosphate | 41.29 | 39.11 | 35.37 | 37.23 | 36.5 |
| gas source | melamine | 14.45 | 15.32 | 12.37 | 12.98 | 12.78 |
| carbon source | pentaerythritol | 1.99 | 0.99 | 3.69 | 3.88 | 10.93 |
| infrared blocker | titanium dioxide | 1.99 | 3.96 | 3.69 | 3.88 | 10.93 |
| reinforcing fibres | enfil ceramic fibres | 2.49 | 2.48 | 3.67 | 0 | 2.51 |
| rheology modifier | garamite | 0 | 0.99 | 0.92 | 0.25 | 0 |
| plasticiser (non-reactive diluent) | bis(2-Ethylhexyl) adipate (DOA) and triethyl phosphate (TEP) | 0 | 0 | 0 | 0 | 7.82 |
| solvent | xylene | 0 | 0 | 0 | 8.1 | 0 |
| moisture scavenger | molecular sieves | 0 | 0 | 0 | 0 | 0 |
| wetting/dispersing aid | organosilane | 0 | 0 | 0 | 1.01 | 0 |
| reactive diluent | vegetable oil | 0 | 0 | 0 | 0.25 | 0 |
| boron containing compound | zinc borate | 0 | 0 | 5.53 | 0 | 0 |

As exemplified in Table 1, examples of the disclosure provide a mixture curable to provide an intumescent coating material. The mixture comprises a silane-terminated polymer, a cross-linker for curing the silane-terminated polymer, mixture to cure to provide an intumescent coating material. Accordingly, examples of the disclosure also provide an intumescent coating material, that is, the reaction product that results from curing of the curable mixture. The reaction product that results from curing of the curable mixture may be referred to as a cured intumescent coating material. The cured intumescent coating material is a hybrid polymer system in that it comprises the cured polymer reaction products of two different materials, namely: silane-terminated polymer and epoxy resin.

In some examples, the curable mixture may also comprise reinforcing fibres, for instance E1, E2 and E3 in Table 1 above.

Reinforcing fibres support the char which forms when the intumescent coating material expands when subjected to a fire event. The char may have a thickness many times the thickness of the intumescent coating. The protective char acts as a physical barrier insulating the substrate and therefore delaying the effects of a fire and slowing the rate of temperature increase of the coated substrate. This therefore protects the substrate from failing or delays the occurrence of failure.

The curable mixtures of examples E1, E2 and E3, once cured, provide an intumescent coating material suitable for protecting substrates in a hydrocarbon facility, for instance, when provided around pipework, valves, I-beams, and other process components and structural members. In such applications the intumescent coating thickness may be from 4 to 18 mm, and more particularly may be from 8 to 12 mm. In such examples, reinforcing fibres are required to support the structural integrity of the relatively thick char which forms when the intumescent coating material expands when subjected to a fire event. Furthermore, the presence of reinforcing fibres in the mixture allows a relatively thick coating to be applied more quickly because of the increased viscosity of the mixture.

In some examples, the curable mixture does not comprise reinforcing fibres, for instance, example 4 (E4) in Table 1 above. The curable mixture of E4, once cured, provides an intumescent coating material suitable for substrates used in transportation, for instance, automotive components and structural members of vehicles. In such applications the intumescent coating thickness may be from 0.1 to 2 mm, and more particularly may be from 0.3 to 1 mm. In such applications the thickness of the intumescent coating (and thickness of the resulting char) may be less than for applications in hydrocarbon facilities because the effects of a fire need be delayed for less time. Accordingly, in such examples reinforcing fibres may not be required to support the structural integrity of the relatively thin char.

In automotive applications, a relatively thin intumescent coating reduces weight and thus improves fuel economy. The absence of reinforcing fibres further reduces the weight of the intumescent coating.

Furthermore, space may be limited around substrates in automotive applications, thus a relatively thin intumescent coating is required.

The application of a relatively thin intumescent coating, for example by spraying, may be hindered by the presence of reinforcing fibres which increase the viscosity of the mixture, making it more difficult to spray onto a substrate and to provide a uniform thickness.

To facilitate spraying of the mixture and to enable the application of a uniform thickness, example mixtures may comprise a solvent, a wetting or dispersing aid and/or a reactive diluent. These additives are particularly beneficial where a relatively thin intumescent coating is required. Such additives reduce viscosity, for instance. In examples of the disclosure, a reduction in viscosity is achieved without plasticisers.

In some examples, the curable mixture may also comprise a rheology modifier to optimise flow properties of the mixture, for instance E2, E3 and E4 in Table 1 above.

In some examples, for instance E3 in Table 1 above, the mixture comprises a boron containing compound to further improve char strength.

In some examples of the disclosure, the mixture curable to provide an intumescent coating material is a two-part mixture. In some examples, a first part comprises the epoxy resin and the intumescent package, and the second part comprises the silane-terminated polymer, the cross-linker for curing the silane-terminated polymer, and the cross-linker for curing the epoxy resin. Additional additives may be provided in the first and/or second parts.

A moisture scavenger may be provided in the first and/or second parts to improve stability of the uncured mixture.

The first and second parts are mixed together to initiate curing, which subsequently provides the intumescent coating material as a cured reaction product. The first part may be prepared by mixing in a high-speed disperser. The second part may be prepared by mixing in a high-speed disperser. In some examples, the first and second parts are subsequently mixed and allowed to cure at ambient temperature, that is any temperature between 5° C. and 50° C., in the presence of atmospheric moisture. The pot life is around 20 to 30 minutes. Full cure is achieved after 12 hours.

The pot life can be tailored, for example, by selecting specific ratios of α-silane-terminated polyether and γ-silane-terminated polyether. The higher the γ-silane content, the slower the pot life of the material.

The silyl groups of silane-terminated polyethers are coupled to the ends of the polyether backbone, and generally via an alkylene unit and a urethane group. The alkylene unit can either be a methylene group, in which case it is an α-silane-terminated polyether, or a propylene group, in which case it is a γ-silane-terminated polyether.

Accordingly, in some examples the silane-terminated polyether is a mixture of α-silane-terminated polyether and γ-silane-terminated polyether. In other examples, the silane-terminated polyether is α-silane-terminated polyether, or alternatively γ-silane-terminated polyether.

Alternatively, or additionally, the pot life can further be tailored by selecting an epoxy curing agent which gives the desired pot life.

In some examples, the mixture is allowed to cure by exposure to moisture already present in the mixture (internal moisture). The moisture may be already present in the intumescent package, that is, the powders of the intumescent package. This allows the mixture to cure in less humid environments. In some examples, the mixture is allowed to cure by exposure to atmospheric moisture and moisture already present in the mixture.

Silane-terminated polymer and the cross-linker for curing the silane-terminated polymer can be provided in the same part, provided moisture is not present. The epoxy resin and the cross-linker for curing the epoxy resin are provided in separate parts, as otherwise the epoxy resin would cure. Surprisingly, the cross-linker for curing the epoxy resin has been found not to cure the silane-terminated polymer, and these materials can therefore be provided in the same part. In examples where the mixture comprises reinforcing fibres and rheology modifiers, these materials may be provided in the second part as otherwise the first part may be too viscous.

Examples of the disclosure also provide an intumescent coating for protecting a substrate. The intumescent coating comprises an intumescent coating material as described above. Examples of the disclosure also provide a method of protecting a substrate.

In some examples, the method comprises coating the substrate with a mixture as described above which is curable to provide an intumescent coating material as described above. The method also comprises allowing the mixture to cure to provide an intumescent coating comprising the intumescent coating material.

In practice, the mixture described above is applied to the substrate, for example by spraying, brushing, rolling, trowelling or moulding. In some examples, the intumescent coating may comprise a plurality of layers of the intumescent coating material. Accordingly, in such examples a first layer of intumescent coating material is applied to the substrate, the mixture is allowed to cure, or at least partially cure, and then a second layer of intumescent coating material is applied on top of the first layer. Subsequent additional layers may be applied. In some examples, the intumescent coating comprises a mesh. The mesh is provided between respective layers of the intumescent coating material. The mesh may comprise stainless steel, basalt, silica, carbon or glass fibre.

In some examples, the substrate is a metallic substrate, for example, structural steel or aluminium. The metallic substrate may comprise a non-metallic coating, such as an anti-corrosion coating. Accordingly, in examples of the disclosure the curable mixture is either applied directly to the metallic substrate or applied to the non-metallic coating of the metallic substrate.

In other examples the substrate may be non-metallic. Example non-metallic substrates include: plastics, polymers, polymeric materials, composites, foams, fibrous insulation materials, other passive insulation materials, concrete and other construction materials, or materials used in transportation, for instance automotive components and structural members of vehicles.

As an alternative to coating the substrate with a curable mixture, in some examples the method may comprise applying a body of intumescent coating material to the substrate to provide an intumescent coating comprising the intumescent coating material, wherein the body of intumescent coating material is the cured reaction product of the mixture. The body of intumescent coating material may be a sheet, film or panel of intumescent coating material, that is, a pre-cured film, sheet or panel.

Multiple bodies (sheets, films or panels) of intumescent coating material may be applied to the substrate to provide an intumescent coating comprising a plurality of layers of the intumescent coating material.

In some examples, the body of intumescent coating material may be applied to an area bridging two or more separate substrates. For example, the body of intumescent coating material may be applied to an area comprising a joint between two separate substrates.

In some examples, the method also comprises applying a top seal to the intumescent coating. The top seal may provide weather protection and/or be decorative.

Examples of the disclosure also provide a protected substrate. The substrate comprises an intumescent coating. The intumescent coating comprises an intumescent coating material, wherein the intumescent coating material is the cured reaction product of the mixture described above. In some examples, the protected substrate comprises a non-metallic layer underlying the intumescent coating, which may be an anti-corrosion layer and/or a top seal overlying the intumescent coating, which may provide weather protection and/or be decorative.

There is thus described a mixture curable to provide an intumescent coating material, a method of providing an intumescent coating material, an intumescent coating material, an intumescent coating for protecting a substrate, a method of protecting a substrate, and a protected substrate with a number of advantages as detailed above and as follows.

In examples of the disclosure, the combination of silane-terminated polymer and epoxy resin, once cured, provides an intumescent coating material with an optimum balance of passive fire resistance, flexibility, toughness, and adhesiveness for use as an intumescent coating (or as a part of an intumescent coating) around substrates such as pipework, valves, I-beams and other process components, structural members, for example in hydrocarbon facilities on or off shore.

In examples of the disclosure, the combination of silane-terminated polymer and epoxy resin, once cured, also provides an intumescent coating material with an optimum balance of passive fire resistance, flexibility, toughness, and adhesiveness for use as an intumescent coating (or as a part of an intumescent coating) around substrates used in transportation, for instance automotive components and structural members of vehicles. An intumescent coating may be provided on a substrate covering an area used to accommodate components of a vehicle which may present a fire risk, for instance batteries.

In such automotive applications, even though the intumescent coating may be relatively thin it still provides the desirable properties as described above.

Without being bound by theory, subsequently cured silane-terminated polymer contributes significantly to the flexibility of the intumescent coating material, and particularly to cold flexibility. For example, epoxy based intumescent coating materials (which do not comprise cured silane-terminated polymer) cannot withstand movement of a substrate, for example, a rig, in cold climates (for example at or below −50° C., such as encountered in the Arctic circle). Such known materials therefore have a tendency to crack and/or fall off. Intumescent coating materials according to examples of the disclosure demonstrate improved flexibility on account of the presence of cured silane-terminated polymer. Accordingly, intumescent coating material according to examples of the disclosure may better move with the substrate, and therefore do not crack and/or fall off the substrate.

Known materials based on silane-terminated polymer, but which do not comprise epoxy resin and may instead comprise a plasticiser, may be easily damaged in use, for instance if such materials are impacted, because of a relatively low toughness. Intumescent coating materials according to examples of the disclosure are less likely to be damaged in use because the presence of cured epoxy resin significantly increases toughness.

The presence of cured epoxy resin in intumescent coating materials according to the disclosure also improves adhesion of the intumescent coating material to other materials, for example, to anti-corrosion coatings and top seals if present.

Furthermore, the presence of epoxy resin in mixtures according to the disclosure permits a significant amount of intumescent package to be provided in the mixture, which leads to improved fire resistance properties in the subsequently cured intumescent coating material.

Furthermore, intumescent coating materials according to examples of the disclosure demonstrate excellent environmental stability.

Furthermore, the use of epoxy resin (i.e. reactive epoxy) in the curable reaction mixture instead of plasticiser considerably improves durability and reduces moisture absorption of the resulting cured intumescent material.

When subjected to a fire event an intumescent coating according to examples of the disclosure expands to form a protective char. The protective Char acts as a physical barrier insulating the substrate and therefore delaying the effects of a fire and slowing the rate of temperature increase of the coated substrate. This therefore protects the substrate from failing or delays the occurrence of failure, thereby providing additional time to permit evacuation, for example, of personnel from a hydrocarbon facility or of the occupants of a vehicle and/or fire fighting.

Although embodiments of the present invention have been described in the preceding paragraphs with reference to various examples, it should be appreciated that modifications to the examples given can be made without departing from the scope of the invention as claimed.

Features described in the preceding description may be used in combinations other than the combinations explicitly described.

Although functions have been described with reference to certain features, those functions may be performable by other features whether described or not.

Although features have been described with reference to certain embodiments, those features may also be present in other embodiments whether described or not.

The term "comprise" is used in this document with an inclusive not an exclusive meaning. That is any reference to X comprising Y indicates that X may comprise only one Y or may comprise more than one Y. If it is intended to use "comprise" with an exclusive meaning then it will be made clear in the context by referring to "comprising only one . . . " or by using "consisting".

In this brief description, reference has been made to various examples. The description of features or functions in relation to an example indicates that those features or functions are present in that example. The use of the term "example" or "for example" or "may" in the text denotes, whether explicitly stated or not, that such features or functions are present in at least the described example, whether described as an example or not, and that they can be, but are not necessarily, present in some of or all other examples. Thus "example", "for example" or "may" refers to a particular instance in a class of examples. A property of the instance can be a property of only that instance or a property of the class or a property of a sub-class of the class that includes some but not all of the instances in the class. It is therefore implicitly disclosed that features described with reference to one example but not with reference to another example, can where possible be used in that other example but does not necessarily have to be used in that other example.

Whilst endeavoring in the foregoing specification to draw attention to those features of the invention believed to be of particular importance it should be understood that the Applicant claims protection in respect of any patentable feature or combination of features hereinbefore referred to and/or shown in the drawings whether or not particular emphasis has been placed thereon.

The invention claimed is:

1. A mixture curable to provide an intumescent coating material, wherein the mixture comprises:
a silane-terminated polymer,
a cross-linker for curing the silane-terminated polymer,
an epoxy resin, wherein the epoxy resin is different from the silane-terminated polymer and wherein the epoxy is not a plasticizer,
a cross-linker for curing the epoxy resin, and
an intumescent package, wherein the intumescent package comprises a phosphorus containing compound, a gas source, and a carbon source,
wherein the ratio of silane-terminated polymer to epoxy resin is 1:1,
wherein the proportion of the intumescent package is greater than the proportion of the epoxy resin in the mixture, and
wherein the mixture curable to provide an intumescent coating material is a two-part mixture, and wherein a first part of the two-part mixture comprises the epoxy resin and the intumescent package, and a second part of the two-part mixture comprises the silane-terminated polymer, the cross-linker for curing the silane-terminated polymer, and the cross-linker for curing the epoxy resin.

2. A mixture according to claim 1, wherein the epoxy resin further comprises an epoxy functionalised reactive diluent.

3. A mixture according to claim 1, wherein the intumescent package consists essentially of the phosphorus containing compound, the gas source, and the carbon source.

4. A mixture according to claim 2, wherein the mixture comprises 1 to 10% by weight of the epoxy functionalised reactive diluent.

5. An intumescent coating for protecting a substrate, the intumescent coating comprising an intumescent coating material, wherein the intumescent coating material is the cured reaction product of a mixture comprising:
a silane-terminated polymer,
a cross-linker for curing the silane-terminated polymer,
an epoxy resin, wherein the epoxy resin is different from the silane-terminated polymer and wherein the epoxy resin is not a plasticizer,
a cross-linker for curing the epoxy resin, and
an intumescent package, wherein the intumescent package comprises a phosphorus containing compound, a gas source, and a carbon source,
wherein the proportion of the intumescent package is greater than the proportion of the epoxy resin in the mixture wherein the proportion of the intumescent package is greater than the proportion of the silane terminated polymer in the mixture, and
wherein the mixture is a two-part mixture, and wherein a first part of the two-part mixture comprises the epoxy resin and the intumescent package, and a second part of the two-part mixture comprises the silane-terminated polymer, the cross-linker for curing the silane-terminated polymer, and the cross-linker for curing the epoxy resin.

6. An intumescent coating according to claim 5, wherein the intumescent coating has a thickness from 8 to 12 mm.

7. An intumescent coating according to claim 5, wherein the intumescent coating is a hybrid polymer system that comprises the cured reaction products of the silane terminated polymer and the epoxy resin.

8. An intumescent coating according to claim 5, wherein the intumescent coating comprises a plurality of layers of the intumescent coating material.

9. An intumescent coating according to claim 8, wherein mesh is provided between respective layers of the plurality of layers.

10. A mixture curable to provide an intumescent coating material, wherein the mixture comprises:
   a silane-terminated polymer,
   a cross-linker fur curing the silane-terminated polymer,
   an epoxy resin, wherein the epoxy resin is different from the silane-terminated polymer and wherein the epoxy resin is not a plasticizer,
   a cross-linker for curing the epoxy resin, and
   an intumescent package, wherein the intumescent package comprises a phosphorus containing compound, a gas source, and a carbon source, and
   wherein the proportion of the intumescent package is greater than the proportion of the epoxy resin in the mixture and wherein the proportion of the intumescent package is greater than the proportion of the silane terminated polymer in the mixture, and
   wherein the mixture curable to provide an intumescent coating material is a two-part mixture, and wherein a first part of the two-part mixture comprises the epoxy resin and the intumescent package, and a second part of the two-part mixture comprises the silane-terminated polymer, the cross-linker for curing the silane-terminated polymer, and the cross-linker for curing the epoxy resin.

11. A mixture according to claim 10, wherein the mixture comprises 10 to 30% by weight of the silane-terminated polymer.

12. A mixture according to claim 10, wherein the mixture comprises 6 to 25% by weight of the epoxy resin.

13. A mixture according to claim 12, wherein the mixture comprises 12 to 17% by weight of epoxy resin.

14. A mixture according to claim 10, wherein the mixture comprises 45 to 75% by weight of the intumescent package.

15. A mixture according to claim 10, wherein the intumescent package consists essentially of the phosphorus containing compound, the gas source, and the carbon source.

16. A mixture according to claim 10, wherein the ratio of silane-terminated polymer to epoxy resin is 1:1.

17. A mixture according to claim 10, wherein the proportion of the intumescent package is greater than the combined proportion of the epoxy resin and the silane terminated polymer in the mixture.

18. A mixture according to claim 10, wherein the mixture comprises 10 to 30% by weight of the silane-terminated polymer, 6 to 25% by weight of the epoxy resin and 45 to 75% by weight of the intumescent package.

19. A mixture according to claim 10, wherein the mixture comprises 10 to 30% by weight of the silane-terminated polymer, 1 to 3% by weight of the cross-linker for curing the silane-terminated polymer, 6 to 25% by weight of the epoxy resin, 1.5 to 6% by weight of the cross-linker for curing the epoxy resin and 45 to 75% by weight of the intumescent package.

\* \* \* \* \*